(12) United States Patent
Gardner et al.

(10) Patent No.: US 7,830,052 B2
(45) Date of Patent: Nov. 9, 2010

(54) ELECTRIC MACHINE HAVING ELECTRICALLY CONDUCTIVE MEMBER AND ASSOCIATED INSULATION ASSEMBLY AND RELATED METHODS

(75) Inventors: William C. Gardner, Rock Hill, SC (US); David J. Shore, Gastonia, NC (US); Phillip R. Keaton, Rock Hill, SC (US)

(73) Assignee: Siemens Energy, Inc., Orlando, FL (US)

( * ) Notice: Subject to any disclaimer, the term of this patent is extended or adjusted under 35 U.S.C. 154(b) by 24 days.

(21) Appl. No.: 12/118,101

(22) Filed: May 9, 2008

(65) Prior Publication Data

US 2009/0278414 A1 Nov. 12, 2009

(51) Int. Cl.
*H02K 11/00* (2006.01)

(52) U.S. Cl. .......................................... 310/71; 310/270

(58) Field of Classification Search .............. 310/261.1, 310/260, 270, 71
See application file for complete search history.

(56) References Cited

U.S. PATENT DOCUMENTS

| 4,870,308 | A | | 9/1989 | Sismour, Jr. |
| 5,063,320 | A | * | 11/1991 | Watanabe et al. ........... 310/270 |
| 5,122,696 | A | | 6/1992 | Shih et al. |
| 6,280,265 | B1 | * | 8/2001 | Hopeck et al. .............. 439/843 |
| 6,347,968 | B1 | * | 2/2002 | Hamilton et al. ............ 439/843 |
| 6,424,063 | B1 | | 7/2002 | Whitener et al. |
| 6,453,540 | B1 | * | 9/2002 | Blakelock et al. ............. 29/598 |
| 6,501,201 | B1 | | 12/2002 | Whitener et al. |
| 7,002,270 | B2 | | 2/2006 | Zhang et al. |
| 7,129,605 | B2 | * | 10/2006 | Zhang et al. .................. 310/71 |
| 2005/0200214 | A1 | | 9/2005 | Zhang et al. |

FOREIGN PATENT DOCUMENTS

| FR | 2656163 A1 | 6/1991 |
| GB | 116577 | 6/1918 |

* cited by examiner

*Primary Examiner*—Nguyen N Hanh

(57) ABSTRACT

An electric machine includes a shaft and a rotor carried by the shaft and having a rotor body, a plurality of rotor windings carried by the rotor body, and a retaining ring surrounding the rotor windings adjacent an end of the rotor body. An electrically conductive stud extends radially outwardly from the shaft adjacent the end of the rotor body. An electrically conductive member includes a first end section coupled to the electrically conductive stud and having a loop shape, a second end section coupled to a corresponding one of the rotor windings, and an intermediate section between the first and second end sections. An insulation assembly is between the shaft and the retaining ring and surrounding the intermediate section to define at least one gap with adjacent portions thereof.

15 Claims, 2 Drawing Sheets

ELECTRIC MACHINE HAVING ELECTRICALLY CONDUCTIVE MEMBER AND ASSOCIATED INSULATION ASSEMBLY AND RELATED METHODS

FIELD OF THE INVENTION

The present invention relates to the field of electric machines, and, more particularly, to electric machines having electrically conductive paths therein and related methods.

BACKGROUND OF THE INVENTION

An electrical generator is a device that converts mechanical energy to electrical energy. The reverse conversion of electrical energy into mechanical energy may be performed by a motor, and motors and generators have many similarities. In the context of power generation, mechanical energy is typically provided to a generator by a combustion turbine or steam turbine.

A typical power generation plant may include a turbine, a generator, and an exciter. The turbine, generator, and exciter are connected together in axial alignment. The turbine converts fuel or heat energy into mechanical energy, in the form of turbine shaft rotation. The generator converts this rotational energy into electrical energy.

The generator includes a shaft and a rotor that rotates within a stator that surrounds the rotor. The rotor has a rotor body around which rotor windings are arranged. The stator has windings positioned parallel to the rotor windings. There is an electrically conductive stud extending radially outwardly from the shaft. An electrically conductive member couples the exciter to the rotor windings via the stud. As the rotor turns, an electrical current is induced in the stator windings. This induced electrical current is then drawn from the stator windings and is applied to an electric load or delivered to a distribution grid.

In the course of its service life, a generator will be subjected to numerous starts and stops. At each start or stop, substantial inertial and thermal stresses act upon the various components of the generator. The inertial stress and centrifugal force experienced by a component of the generator may depend upon the radial distance of the component from the axis of the rotor and the mass of the component. Therefore, different generator components may experience different magnitudes of these forces.

The electrically conductive path that carries current from the stud to the rotor windings is commonly known in the art as a J-strap. This J-strap is subjected to similar operating conditions and forces as the other generator components. Since different generator components experience different magnitudes of these forces, the J-strap may experience differential forces because different portions of the J-strap are connected to different generator components. J-strap failure due to this force differential at various points can be problematic, as such a failure can cause electric arcing and re-routing of the current through nearby electrically conductive materials, melting various components and otherwise damaging the generator.

One attempt at reducing J-strap failures focused on altering the generator rotor lead path. U.S. Pat. No. 6,501,201 to Whitener et al. discloses an apparatus that forms a conductive path for carrying an electric current in a generator. The apparatus includes an electrically conductive axial lead path that forms a portion of the conductive path. An electrically conductive strap forms another portion of the conductive path. Furthermore, a radial lead is coupled to the axial lead and the strap, forming yet another portion of the conductive path. The radial lead is not supported and restrained in the rotor.

Another attempt at reducing J-strap failure is disclosed in U.S. Pat. No. 7,129,605 to Zhang et al., which is directed to an interconnecting assembly for a rotor of an electric machine. This assembly is part of a conductive path extending from a radially inward section of the rotor assembly to a winding located at a radially outward section of the rotor assembly. The assembly includes a flexible member having a bend. A connector is coupled to the flexible member to pass axial and radial forces that develop during operation of the machine. The positioning of the connector relative to the flexible member may be arranged so that an effect of an axial force on a radius of curvature of the bend and an effect of a radial force on that radius of curvature are opposed to one another. This reduces mechanical stress on the flexible member.

However, other structures to enhance the longevity of a J-strap and to reduce the differential forces experienced thereby may be desirable.

SUMMARY OF THE INVENTION

In view of the foregoing background, it is therefore an object of the present invention to provide an electric machine having enhanced and robust conductor structures.

This and other objects, features, and advantages in accordance with the present invention are provided by an electric machine comprising an electrically conductive member and an insulating assembly therefor. In particular, the electric machine may include a shaft and a rotor carried by the shaft and comprising a rotor body and a plurality of rotor windings may be carried by the rotor body. The rotor may also include a retaining ring surrounding the rotor windings adjacent an end of the rotor body. An electrically conductive stud may extend radially outwardly from the shaft adjacent the end of the rotor body.

The electrically conductive member may include a first end section coupled to the electrically conductive stud and having a loop shape. A second end section may be coupled to a corresponding one of the rotor windings, and an intermediate section may be between the first and second end sections. Moreover, the insulation assembly may be positioned between the shaft and the retaining ring which surrounds the intermediate section to define at least one gap with adjacent portions thereof.

The at least one gap may comprise a radially outer gap. Additionally or alternatively, the at least one gap may comprise a pair of circumferentially spaced gaps on opposing sides of the intermediate section. These gaps allow the intermediate section to move under the influence of centrifugal force, thereby relieving some of the stresses upon the electrically conductive member. This may extend the life of the electrically conductive member.

In some embodiments, the insulation assembly may include an insulating base, and an insulating body having an inverted U-shape positioned adjacent the base to define a channel therewith to receive the intermediate section therein. Such embodiments may include an outer insulating spacer in the channel, radially outer from the intermediate section. Some embodiments may include first and second side insulating spacers in the channel adjacent respective first and second sides of the intermediate section. These spacers may be sized to provide gaps of different sizes.

The first end section may comprise a plurality of stacked electrically conductive strips coupled together to define a flexible loop. Additionally, the intermediate section may comprise a solid conductor section. Moreover, the second end section may comprise at least one electrically conductive strip and an insulating layer thereon.

Another aspect is directed to a method of making an electrical connection in an electric machine comprising a shaft, a rotor body carried by the shaft, a plurality of rotor windings carried by the rotor body, a retaining ring surrounding the rotor windings adjacent an end of the rotor body, and an electrically conductive stud extending radially outwardly from the shaft adjacent the end of the rotor body.

The method may comprise coupling a first end section having a loop shape to the electrically conductive stud. Additionally, the method may comprise coupling a second end section to a corresponding one of the rotor windings with an intermediate section coupled between the first and second end sections. Moreover, the method may further comprise positioning an insulation assembly between the shaft and the retaining ring to surround the intermediate section to define at least one gap with adjacent portions thereof. The at least one gap may be a radially outer gap. Additionally or alternatively, the at least one gap may comprise a pair of circumferentially spaced gaps on opposing sides of the intermediate section.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
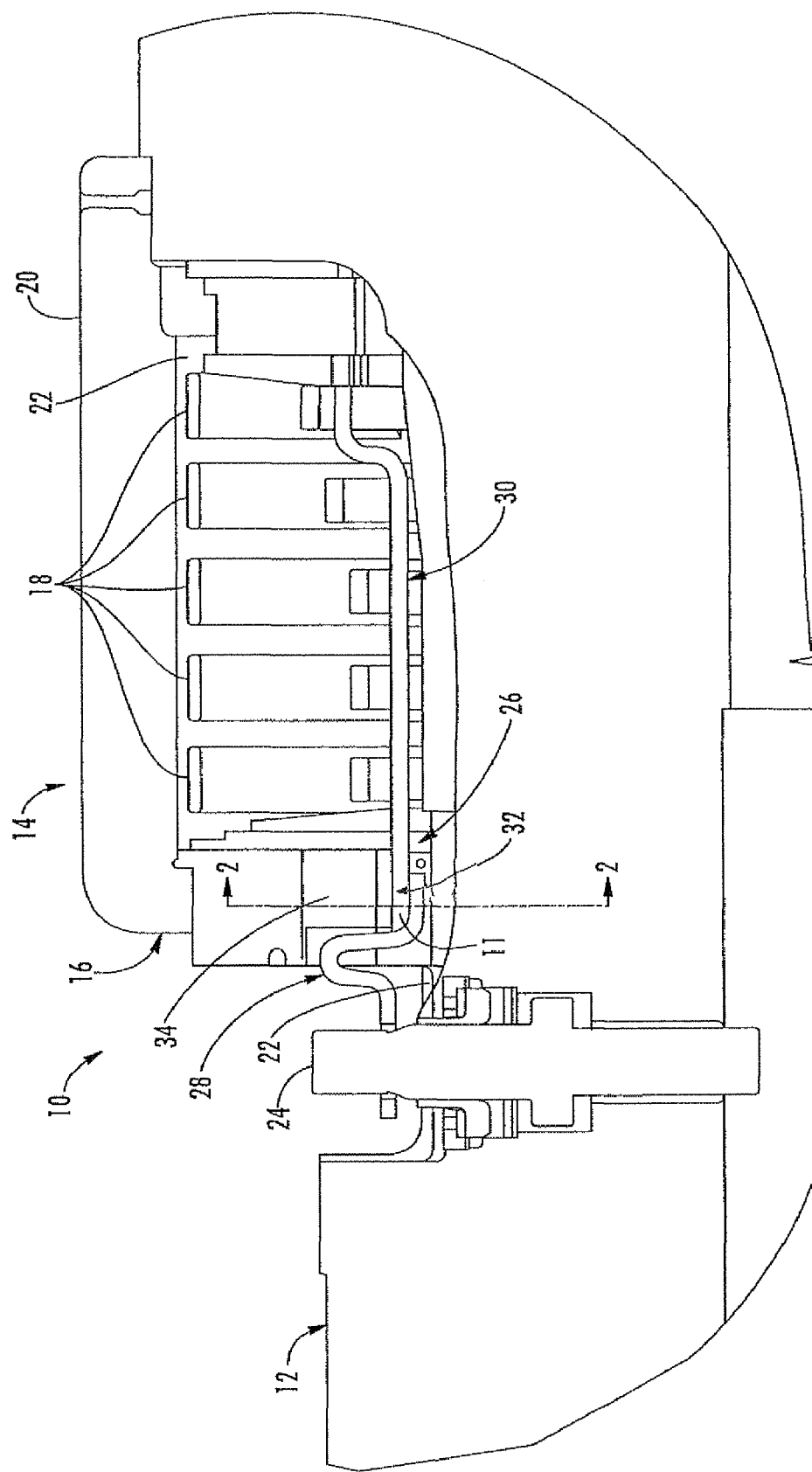
FIG. 1 is a schematic cutaway side elevation view of an electrical machine in accordance with the present invention.
Figure 2:
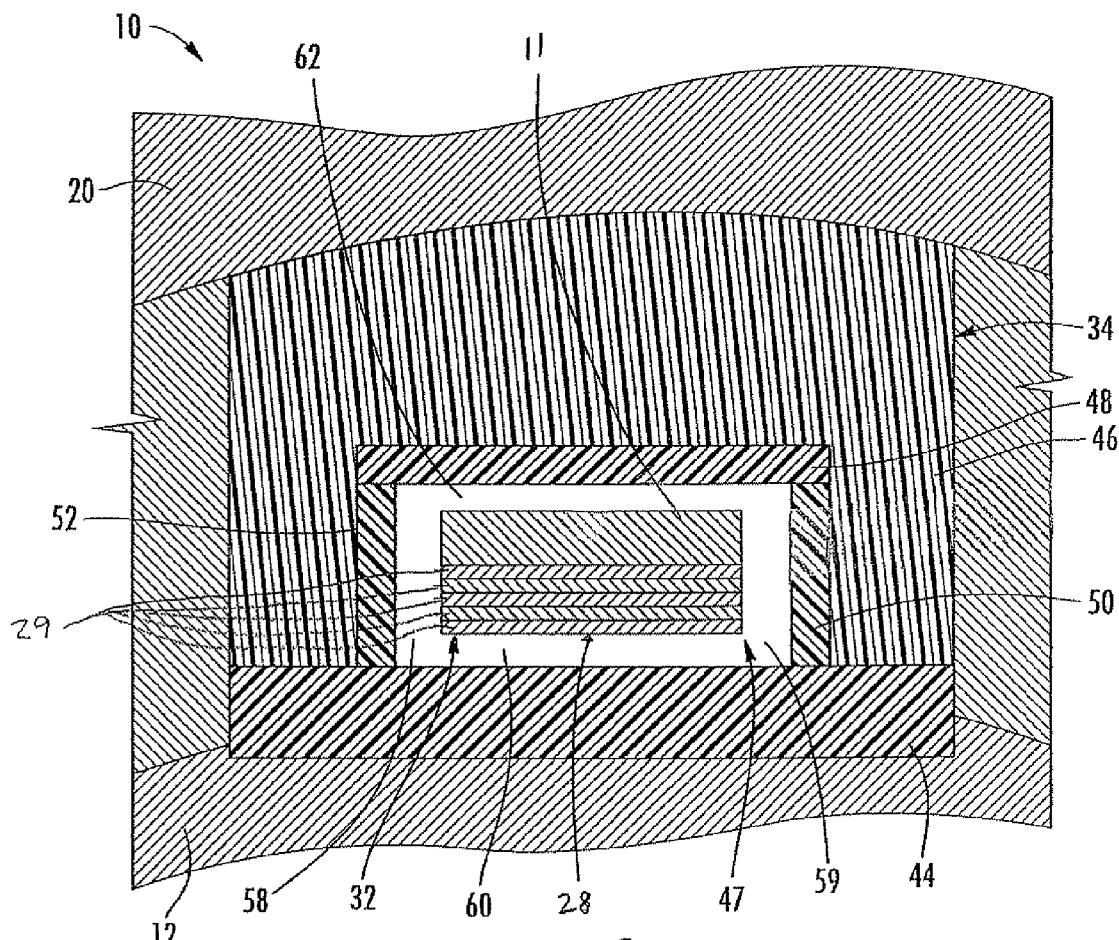
FIG. 2 is a cross sectional view of the electrical machine of FIG. 1, taken along line 2-2.

Referring initially to FIGS. 1 and 2, an embodiment of an electrical machine 10 is now described. The electrical machine 10 includes a shaft 12 and a rotor 14 carried by the shaft. The shaft 12 may have a hollow bore to facilitate the placement of conductors therein, as will be appreciated by those of skill in the art. The rotor 14 may be integrally formed as part of the shaft 12 or may be otherwise attached to the shaft.

The rotor 14 comprises a rotor body 16 and a plurality of rotor windings 18 carried by the rotor body. A retaining ring 20 surrounds the rotor windings 18 adjacent an end 22 of the rotor body. The retaining ring 20 may be a steel alloy. The rotor windings 18 may be copper, or may be of other suitable conductive materials as will be appreciated by those of skill in the art.

An electrically conductive stud 24 extends radially outward from the shaft 12 adjacent the end 22 of the rotor body 16. One of skill in the art will recognize that the electric machine 10 includes a plurality of electrically conductive studs 24; however, for clarity of explanation, only one is illustrated. The electrically conductive stud 24 is advantageously constructed of a high-strength conductive material, such as an alloy, to withstand the varying stresses, loads, and other forces exerted on it during generator operation.

An electrically conductive member 26 comprises a first end section 28 coupled to the electrically conductive stud 24 and has a loop shape. A second end section 30 is coupled to a corresponding one of the rotor windings 18. There is an intermediate section 32 between the first end section 28 and the second end section 30. The electrically conductive member 26 may typically be referred to as a J-strap by those of skill in the art.

As shown perhaps best in the cross sectional view of FIG. 2, the first end section 28 illustratively comprises a plurality of stacked electrically conductive strips 29 coupled together to define a flexible loop. Preferably, the flexible loop will be constructed from at least 5 stacked electrically conductive strips, each approximately 0.30" thick. More preferably, the flexible loop will be constructed from 10 to 12 stacked electrically conductive strips. This configuration allows the flexible loop to bend, contort, and accept stresses and forces that might otherwise cause failure. Those of skill in the art will recognize that the number and/or thickness of the electrically conductive strips may vary depending on the electromechanical requirements of the electric machine 10. For example, the collective cross-section of the electrically conductive strips 29 should be sufficiently large to properly carry the current used by a specific application. Another design consideration for selecting the number and thickness of the electrically conductive strips 29 may be the mechanical stress to be handled by the flexible member.

The intermediate section 32 illustratively comprises a solid conductor 11 overlapping portions of the plurality of stacked electrically conductive strips 29 of the first end section 28, and abutting portions of the second end section 30. The coupling between the solid conductor 11 of the intermediate section 32 and the first and second end sections 28, 30 may be implemented by brazing or welding, for example. The intermediate section 32 may be a separate conductor coupled to the first and second end sections 28, 30 by suitable attachment methods known to those of skill in the art. Alternatively, the intermediate section 32 may be integrally formed contiguous with the first end section 28 and the second end section 30.

An insulation assembly 34 is illustratively between the shaft 12 and the retaining ring 20, which surrounds the intermediate section 32 to define at least one gap with adjacent portions thereof. The at least one gap illustratively comprises a radially inner gap 60, a radially outer gap 62, and a pair of circumferentially spaced gaps 58, 59 on opposing sides of the intermediate section 32. Those of skill in the art will appreciate that the gap(s) shown in FIG. 2 are greatly exaggerated for ease of understanding.

When the rotor windings 18 are thrown outward by centrifugal force, the intermediate section 32 and the second end section 30 move radially outward more than the first end section 28. This difference in radial movement arises because the rotor windings 18 are typically made from a more flexible material (typically copper) than the electrically conductive stud 24.

In some applications, the difference may be 0.10", although the difference may be greater or lesser in other applications, as will be appreciated by those of skill in the art. This difference in radial movement causes the electrically conductive member 26 to experience forces which may lead to deformation and even potentially failure. The radially inner and/or outer gaps 60, 62 advantageously allow the intermediate section 32 to move radially outwardly or inwardly, by 0.10", relieving the stresses on the electrically conductive member 26 caused by the differential forces, while preventing excessive radial movement which might result in contact between the electrically conductive member and other moving parts. Likewise, the pair of circumferentially spaced gaps 58, 59 may allow the intermediate section 32 to move circumferentially about the shaft 12 by 0.60". In other embodiments, the gaps 58, 59, 60, 62 may each allow the intermediate section 32 to move a different amount in each direction and these amounts may be greater or less than 0.10".

The insulation assembly 34 illustratively includes an insulating base 44, and an insulating body 46 having an inverted U-shape position adjacent the insulating base to define a channel 47 therewith to receive the intermediate section 32 therein. One of skill in the art will appreciate that the insulating base 44 and insulating body 46 may be constructed from suitable insulating materials, such as ceramic or glass.

In the channel 47, radially outer from the intermediate section 32 is an outer insulating spacer 48. First and second side insulating spacers 50, 52 are in the channel adjacent respective first and second sides of the intermediate section 32. The radially outer insulating spacer 48, and first and second side insulating spacers 50, 52 may be of various sizes and shapes to allow for customization of the respective size and shapes of the gaps 58, 59, 60, 62. It is to be understood that these spacers 48, 50, 52 may be removed and replaced from the electric machine 10, to allow maintenance personnel to adjust the size and shapes of the gaps 58, 59, 60, 62. It will be understood by those skilled in the art that the gap(s) would typically be set with the electric machine 10 near room temperature and that the gap(s) may change depending upon temperature.

The spacers 48, 50, 52 may be constructed of suitable insulators, preferably glass. The sides of the spacers 48, 50, 52 that face the intermediate section 32 may have a friction reducing coating or layer thereon, such as, for example, Teflon. This friction reducing coating may reduce wear to the intermediate section 32 caused by contact with the spacers 48, 50, 52.

Figure 3:
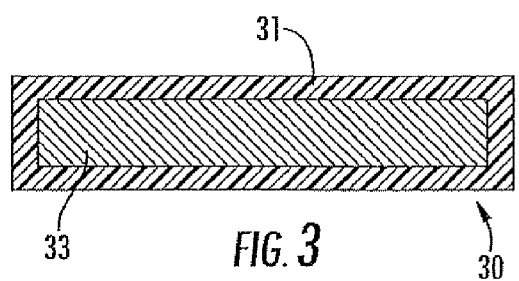
FIG. 3 is a cross sectional view of the second end section of the electrically conductive member as shown in FIG. 1.

As shown in the cross sectional view of FIG. 3, the second end section 30 comprises a solid conductor 33 surrounded by an insulating layer 31. In some embodiments, the second end section 30 may comprise at least one electrically conductive strip and an insulating layer thereon. The second end section 30 may also be made of a plurality of stacked electrically conductive strips surrounded by an insulating layer.

Referring again to FIGS. 1 and 3, another aspect relates to a method of making an electrical connection in an electric machine 10 comprising a shaft 12, a rotor body 16 carried by the shaft, a plurality of rotor windings 18 carried by the rotor body, a retaining ring 20 surrounding the rotor windings adjacent an end of the rotor body 22, and an electrically conductive stud 24 extending radially outwardly from the shaft adjacent the end of the rotor body.

The method may comprise coupling a first end section 28 having a loop shape to the electrically conductive stud 24. Additionally, the method may comprise coupling a second end section 30 to a corresponding one of the rotor windings 18 with an intermediate section 32 coupled between the first and second end sections 28, 30. Moreover, the method may further comprise positioning an insulation assembly 34 between the shaft 12 and the retaining ring 20 to surround the intermediate section 32, to define at least one gap with adjacent portions thereof. The at least one gap may be a radially inner gap 60 and/or a radially outer 62 gap. Additionally or alternatively, the at least one gap may comprise a pair of circumferentially spaced gaps 58, 59 on opposing sides of the intermediate section 32.

The insulation assembly 34 may comprise an insulating base 44 and an insulating body 46 having an inverted U-shape to be positioned adjacent the base to define a channel 47 therewith to receive the intermediate section 32 therein.

An outer insulating spacer 48 may be positioned in the channel 47 radially outer from the intermediate section 32. Likewise, first and second side insulating spacers 50, 52 may be positioned in the channel 47 adjacent respective first and second sides of the intermediate section 32.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. An electric machine comprising:
   a shaft;
   a rotor carried by said shaft and comprising a rotor body, a plurality of rotor windings carried by said rotor body, and a retaining ring surrounding said rotor windings adjacent an end of said rotor body;
   an electrically conductive stud extending radially outwardly from said shaft adjacent the end of said rotor body;
   an electrically conductive member comprising
      a first end section coupled to said electrically conductive stud and having a loop shape,
      a second end section coupled to a corresponding one of said rotor windings, and
      an intermediate section between said first and second end sections; and
   an insulation assembly between said shaft and said retaining ring and surrounding said intermediate section to define at least one gap with adjacent portions thereof.

2. The electric machine of claim 1, wherein the at least one gap comprises a radially outer gap.

3. The electric machine of claim 1, wherein the at least one gap comprises a pair of circumferentially spaced gaps on opposing sides of said intermediate section.

4. The electric machine of claim 1, wherein said insulation assembly comprises:
   an insulating base; and
   an insulating body having an inverted U-shape positioned adjacent said base to define a channel therewith receiving said intermediate section therein.

5. The electric machine of claim 4, further comprising an outer insulating spacer in said channel radially outer from said intermediate section.

6. The electric machine of claim 4, further comprising first and second side insulating spacers in the channel adjacent respective first and second sides of said intermediate section.

7. The electric machine of claim 1, wherein said first end section comprises a plurality of stacked electrically conductive strips coupled together to define a flexible loop.

8. The electric machine of claim 1, wherein said intermediate section comprises a solid conductor section.

9. The electric machine of claim 1, wherein said second end section comprises at least one electrically conductive strip and an insulating layer thereon.

10. An electric machine comprising:
    a shaft;
    a rotor carried by said shaft and comprising a rotor body, a plurality of rotor windings carried by said rotor body, and a retaining ring surrounding said rotor windings adjacent an end of said rotor body;

an electrically conductive stud extending radially outwardly from said shaft adjacent the end of said rotor body;

an electrically conductive member comprising
- a first end section coupled to said electrically conductive stud and having a loop shape, said first end section comprising a plurality of stacked electrically conductive strips coupled together to define a flexible loop,
- a second end section coupled to a corresponding one of said rotor windings, and
- an intermediate section between said first and second end sections; and an insulation assembly between said shaft and said retaining ring and surrounding said intermediate section to define at least one gap with adjacent portions thereof;

said insulation assembly comprising
- an insulating base,
- an insulating body having an inverted U-shape positioned adjacent said base to define a channel therewith receiving said intermediate section therein, and
- an outer insulating spacer in said channel radially outer from said intermediate section.

11. The electric machine of claim 10, wherein the at least one gap comprises a radially outer gap.

12. The electric machine of claim 10, wherein the at least one gap comprises a pair of circumferentially spaced gaps on opposing sides of said intermediate section.

13. The electric machine of claim 10, further comprising first and second side insulating spacers in the channel adjacent respective first and second sides of said intermediate section.

14. The electric machine of claim 10, wherein said intermediate section comprises a solid conductor section.

15. The electric machine of claim 10, wherein said second end section comprises at least one electrically conductive strip and an insulating layer thereon.

* * * * *